United States Patent [19]
Pearce

[11] Patent Number: 5,470,212
[45] Date of Patent: Nov. 28, 1995

[54] HUMIDITY CONTROL SYSTEM INCLUDING A PERISTALTIC PUMP AND INCUBATORS CONTAINING THE SAME

[76] Inventor: Francis H. Pearce, Stoneleigh, Hill Road, Sandford, Avon BS19 5RH, United Kingdom

[21] Appl. No.: 238,717

[22] Filed: May 5, 1994

[30] Foreign Application Priority Data

May 7, 1993 [GB] United Kingdom ............... 9309427

[51] Int. Cl.$^6$ .................................................. F04B 43/08
[52] U.S. Cl. ................................. 417/477.13; 236/44 R; 119/35
[58] Field of Search .................. 417/476, 477.1, 417/477.3, 477.13, 477.6; 119/30, 35, 37, 41; 236/44 R, 44 A

[56] References Cited

U.S. PATENT DOCUMENTS

| | | | |
|---|---|---|---|
| 1,424,821 | 8/1922 | Heck | 119/37 |
| 1,518,162 | 12/1924 | Parkinson | 119/30 |
| 1,589,886 | 6/1926 | Loepsinger | 236/44 A |
| 2,296,930 | 9/1942 | Imler | 119/37 |
| 2,319,091 | 5/1943 | Smith | 236/44 R |
| 2,560,006 | 7/1951 | Snyder | 236/44 A |
| 2,570,451 | 10/1951 | Hottenroth | 236/44 A |
| 2,885,967 | 5/1959 | Vogel et al. | 417/477.13 |
| 3,585,650 | 6/1971 | Lekberg et al. | 417/477.13 |
| 3,783,832 | 1/1974 | Marsh | 119/37 |
| 3,817,214 | 6/1974 | Bardet | 119/37 |
| 3,854,452 | 12/1974 | Bardet | 119/35 |
| 3,896,827 | 7/1975 | Robinson | 417/477.13 |
| 4,181,476 | 1/1980 | Malbec | 417/477.3 |
| 4,668,854 | 5/1987 | Swan | 719/273 |
| 5,025,619 | 6/1991 | Cannon | 119/35 |
| 5,222,880 | 6/1993 | Montoya et al. | 417/477.13 |

*Primary Examiner*—Richard A. Bertsch
*Assistant Examiner*—Peter G. Korytnyk
*Attorney, Agent, or Firm*—Klauber & Jackson

[57] ABSTRACT

There is disclosed a peristaltic pump which comprises a flexible tube for the passage of a fluid having an inlet and an outlet and a roller assembly comprising a number of rollers and a rotatable support, the rollers being mounted on and extending substantially perpendicularly outward from the rotatable support and the tube being stretched over the roller assembly so that it extends substantially perpendicularly to the rollers and through substantially 360° around the roller assembly and where the tube contacts a roller it is compressed against that roller, the arrangement being such that in use where the tube is compressed against a roller it is occluded and rotation of the roller assembly causes each roller to contact and thereby occlude successive parts of the tube forcing fluid contained in the tube and trapped between the occlusions to be moved along the tube from the inlet towards the outlet.

15 Claims, 2 Drawing Sheets

HUMIDITY CONTROL SYSTEM INCLUDING A PERISTALTIC PUMP AND INCUBATORS CONTAINING THE SAME

BACKGROUND OF THE INVENTION

Peristaltic pumps are well known and are used for various applications where a fluid is required to be pumped through a tube. Peristaltic pumps are able to control the flow rate of the fluid through the tube and can allow it to be dispensed in precise discrete volumes. Peristaltic pumps are considered advantageous as there is no contact between the fluid and the pump so contamination is avoided, back flow of liquids through the pump is inherently prevented and stripping and cleaning of the pump is not required—merely the quick and easy rinsing or exchanging of the tube.

There are two main types of known peristaltic pump. In the first the pumping action is achieved by compressing a flexible tube between rotating rollers and a fixed, profiled former. The fixed former is often semi-circular and the flexible tube is fixed so that it lies against the inside of the semi-circular shape. Rollers, usually two or three in number, are mounted on a rotating assembly concentric with the semi-circular former such that the tube is compressed by each roller in turn by the rotation of the assembly, which causes fluid trapped between two or more occlusions to be moved through the tube in the direction of rotation of the assembly. Such pumps require a considerable accuracy of manufacture to ensure that the correct clearances are maintained to completely occlude the tube without causing unnecessary deformation.

The second type of peristaltic pump, which is generally the one used for low duty applications, is where occlusion of the tube is achieved by stretching it over a rotating assembly consisting of three or four rollers. In this case it is the tension in the tube which causes the compression against the roller and thus the occlusion. This system, although much simpler in construction, has certain disadvantages. A fairly high tension is required to ensure occlusion of the tube and, since the tube is usually stretched only over one side of the roller assembly the tension causes appreciable side loading on the roller assembly, and its bearing shaft and associated motor, shortening the pump's useful life and increasing torque requirements.

The present invention overcomes or substantially mitigates the problems associated with known peristaltic pumps.

SUMMARY OF THE INVENTION

According to a first aspect of the present invention there is provided a humidity control system for measuring and controlling the humidity of a controlled environment of the type having a pump capable of supplying water to the controlled environment and sensors capable of measuring the humidity in the controlled environment, wherein the pump is a peristaltic pump of the type having a flexible tube stretched over a roller assembly comprising a number of rollers mounted on a rotatable support, the tube being stretched over the roller assembly in such a manner that where the tube is compressed against a roller it is occluded and rotation of the roller assembly causes fluid contained in the tube and trapped by occlusion to be moved along the tube, wherein the tube extends through substantially 360° around the roller assembly.

Since the tube of a peristaltic pump according to the present invention passes right around the roller assembly the tension in the tube is evenly balanced and side loading thereby avoided.

Although any suitable number of rollers may be used, e.g. from two to five, the peristaltic pump according to the present invention has been found to be particularly advantageous where two rollers alone are used. With such an arrangement the tube bends through an angle of 160° to 200°, e.g. approximately 180°, as it passes each roller. The angle through which the tube bends and the relative dimensions of the tube and roller have been found to affect the occlusion of the tube. Reliable occlusion with relatively low tension in the tube has been found to occur where the diameter of the roller is similar to, i.e. substantially corresponds to, or is lees than the outer diameter of the tube. In particular, reliable occlusion achievable even with relatively low tension is possible with relatively small diameter rollers, e.g. those with a diameter between 1.5 and 5 mm, particularly when used with tubes having corresponding outer diameters in the same range.

The rollers may be made of any suitable material, e.g. a metal such as stainless steel or a plastics material such as polytetrafluoroethylene (PTFE). They may if desired be provided with a suitable coating or sleeve to assist in the rotating occlusion of the tube.

The rollers are preferably mounted on the rotatable support so that they extend substantially perpendicularly to the tube.

The rotatable support may take any suitable form, for example the form of a disc out from which the rollers extend perpendicularly, The support may be made from any suitable material, e.g. metal or plastics.

The tubes may also be made of any suitable resilient material, such as silicon rubber or PVC. The size of tube used will depend in part upon the application for which the pump is to be used. Tubes having outer diameters in the range 1 to 10 mm, e.g. 2 to 6 mm, may be used. The inner diameter of the tubes will vary depending on the desired application, the desired tube thickness and the fluid to be pumped. The inner tube diameter could be in the range 0.5 to 9.5 mm, and should be such as to provide the required tube thickness, e.g. 0.3 to 1 mm, for example 0.5 mm.

More than one tube may be used per roller assembly, e.g. the peristaltic pump could be a multi-channel pump having from two to ten flexible tubes.

Preferably the inlet of the tube is situated on one side of the roller assembly and the outlet on an opposing side. It has been found that the anchorage points of the inlet and outlet side of the flexible tube affect the degree of stretching and relaxation of the tube during rotation of the roller assembly. Such stretching and relaxation is minimised if the inlet and outlet sides of the tube are anchored at positions approximately level with a point halfway between the central axis of rotation of the roller assembly and a point on the circumference of the circle of rotation of the rollers which in use is vertically above the central rotational axis. With such anchorage or mounting the length of the tube is substantially constant throughout rotation of the roller assembly.

For most applications the roller assembly will be mounted on a motor driven shaft.

A peristaltic pump according to the present invention is an improvement over conventional peristaltic pumps. In particular, as the tube is arranged to pass through at least 360° around the roller assembly, the tension on the assembly is evenly balanced with minimum side loading on any drive shaft on which it is mounted. In practice, it has been found that much lower drive torque is provided for similar pumping duty. The improved performance of the present invention enables the pump to be used in applications where the first type of peristaltic pump described above would have been required before, allowing significant economy. Furthermore, as reliable occlusion is possible with relatively low tension in the tube, all components of the pump (e.g. the motor, the drive shaft, the tubes, and the roller assembly) are able to have a longer working life.

A peristaltic pump according to the present invention may be used in a wide variety of applications particularly those requiring a low volume pump. It may, for example, be used wherever filtration, separation or dispensing of a fluid is required and it can also be used in the control of a wide variety of fluids such as water, ink and chemically reactive fluids. Such a pump is of particular use in the control of relative humidity by the controlled pumping of water into an environment in which the humidity is to be controlled.

The pump is of particular use in humidity control systems in which it draws water from a water source, generally outside the controlled humidity environment, and delivers it to that environment in response to sensors measuring the humidity within the environment.

Humidity control systems usually rely on measuring relative humidity within the controlled environment either with directly responding electronic humidity sensors or by comparing the temperature of wet bulb and dry bulb temperature sensors. Electronic humidity sensors are very convenient to use but have certain important disadvantages. In particular they are expensive, subject to hysteresis and long term drift. They are also difficult to recalibrate without specialised knowledge and laboratory equipment. On the other hand, wet bulb and dry bulb temperature sensors may include inexpensive thermistors and have high accuracy and stability and are relatively easy to calibrate. Wet bulb and dry bulb temperature sensors suffer from the disadvantage that they are only able to measure relative humidity if the wet bulb is kept wet. Wet bulbs are provided with a wick which requires a constant source of water, e.g. a continuous flow of water in contact with the wick, without which the system ceases to properly control the relative humidity. In conventional humidity control systems a small amount of the water which is being supplied to the controlled environment to humidify it is bled off to moisten the wet bulb wick. In such systems when the humidifying water is not being pumped past the wick, e.g. if the system is at a low humidity setting which may cause the pump to stop for several hours, the wick may become dry and the system is then no longer able to measure and thereby control the relative humidity of the environment.

A humidity control system has now been found which overcomes or substantially mitigates the problems of conventional humidity control systems.

According to a second aspect of the present invention there is provided a humidity control system for measuring and controlling the humidity of a controlled environment of the type having a pump capable of supplying water to the controlled environment and a dry bulb and a wet bulb temperature sensor capable of measuring the humidity in the controlled environment, the wet bulb temperature sensor being provided with a wick via which it can be kept wet, wherein the pump is a peristaltic pump having a flexible tube stretched over a roller assembly comprising a number of rollers mounted on a rotatable support, the tube being stretched over the roller assembly in such a manner that where the tube is compressed against a roller it is occluded and rotation of the roller assembly causes fluid contained in the tube and trapped by occlusion to be moved along the tube, wherein the tube extends through substantially 360° around the roller assembly and the system is provided with a storage reservoir which is capable of storing water supplied to it by the pump and into which the wet bulb wick can extend so as to be moistened by any water stored therein.

With such a system the wet bulb wick will remain wet even if the pump is stopped and there is no flow of humidifying water into the con, rolled environment as long as there is water in the reservoir. Indeed, if the pump is switched off and humidifying water input ceases, the wet bulb wick will continue to be supplied with water until the storage reservoir is exhausted. Until that time humidity measurement and control can continue.

The storage reservoir may be supplied by a separate flow of water from the pump, or more preferably it is supplied with water from the flow of humidifying water being supplied to the controlled environment. The storage reservoir is preferably situated so that it must be filled before humidifying water can enter the controlled environment.

The capacity of the storage reservoir can be varied as desired to meet the needs of the application for which the system is being used. The capacity may, for example, be sufficient to keep the wet bulb wick wet for 48 hours after the pump has stopped. This would give sufficient time for control setting changes to be made and even exhaustion of the main water source would not invalidate the control system for a considerable time.

The storage reservoir may be situated either inside or outside of the controlled environment. It may be a separate component from the controlled environment or be integral therewith.

So that the reservoir can be supplied with water from the pump it should be provided with an inlet connectable to the pump. In addition, where the storage reservoir is situated between the pump and the controlled environment and is supplied with water from the humidifying water flow, it should also be provided with an outlet in fluid connection with the controlled environment. The inlet and any outlet are preferably positioned towards the top of the storage reservoir to allow maximum storage capability.

The pump will draw water from a water source, for example a main reservoir, that can be situated either inside or outside of the controlled environment. The pump will then deliver humidifying water into the controlled environment, e.g. into an internal water store or onto absorbent material situated in the controlled environment.

The pump is preferably controlled by an electronic controller which monitors the temperature of the wet bulb and dry bulb sensors inside the controlled environment and regulates the pumped flow of humidifying water accordingly. Other controls may also be provided to inform an operator of the water level within the storage reservoir as well as in any main reservoir.

The humidity control system of the second aspect of present invention is advantageous as sensing of humidity in the controlled environment is possible even when the peristaltic pump is switched off for as long as it takes for water in the storage reservoir to be exhausted. In addition the humidity control system also benefits from all of the advantages of the peristaltic pump of the first aspect of the invention which are mentioned above.

The humidity control systems of the present invention may be used whenever control of humidity is required, for example in museum display cases, in animal cages and for storing articles. They may be of use, for example, where delicate plants or animals are being reared or assisted in recovery from illness. The humidity control systems of the present invention are of particular value in conjunction with incubators, particularly those for the incubation of eggs.

According to a third aspect of the present invention there is provided an incubator having a humidity control system according to the first aspect of the present invention.

According to a fourth aspect of the present invention there is provided an incubator having a humidity control system according to the second aspect of the present invention.

BRIEF DESCRIPTION OF THE DRAWINGS

For a better understanding of the present invention, and to show how the same may be put into effect, reference will now be made to the accompanying drawings in which.

DESCRIPTION OF THE PREFERRED EMBODIMENTS

Figure 1A:
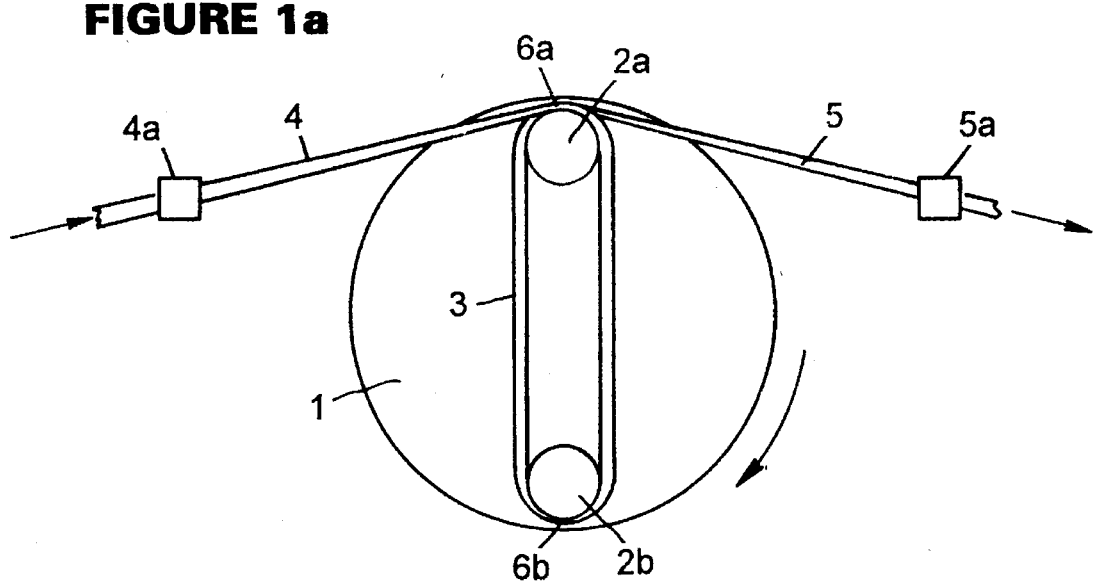
FIG. 1 is a schematic front view of a peristaltic pump according to the present invention in various rotational positions.

The peristaltic pump shown in FIG. 1 comprises a circular disc 1 which acts as a support member to two rollers 2a, 2b mounted close by the circumference of the support disc 1 on opposing sides. The rollers 2a, 2b take the form of stainless steel pins extending perpendicularly from the disc 1 around which PTFE sleeves are mounted so as to be rotatable about the pins and thereby act as rollers. The support disc 1 is mounted on a drive shaft (not shown) extending perpendicularly backwards from the frontal view shown in the drawing to a motor (not shown) by which the support disc 1 is rotatably driven. A flexible tube 3 extending perpendicularly to the roller 2a, 2b is anchored on its inlet side 4 and outlet side 5 at positions approximately level with a point halfway between the central rotational axis of the support disc 1 and a point vertically above that central axis on the circumference of the circle of rotation of the rollers 2a, 2b. The flexible tube 3 is wrapped around both rollers 2a, 2b a full 360° so that the inlet 4 is on one side of the support disc 1 whereas the outlet 5 is on an opposite side. The flexible tube 3 is in tension and where it is compressed against the rollers 2a, 2b it is occluded 6a, 6b.

Figure 1B:
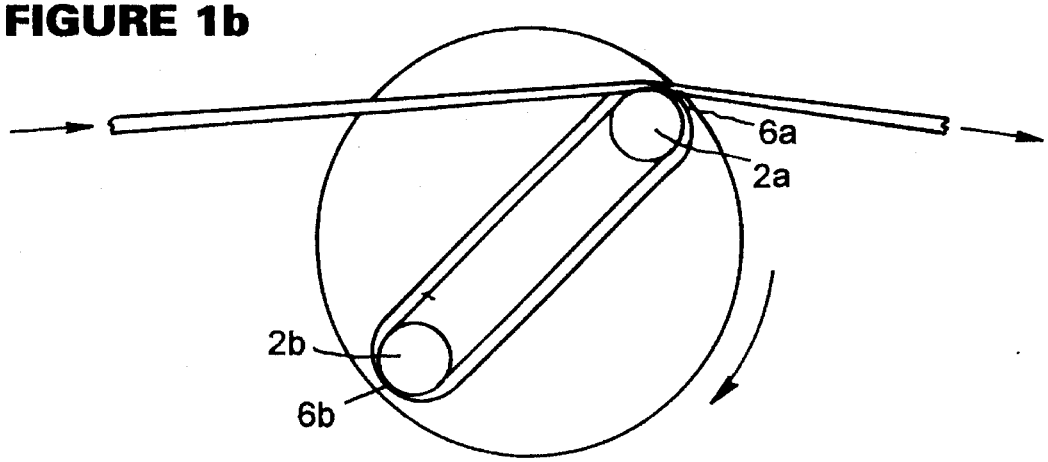
Figure 1C:
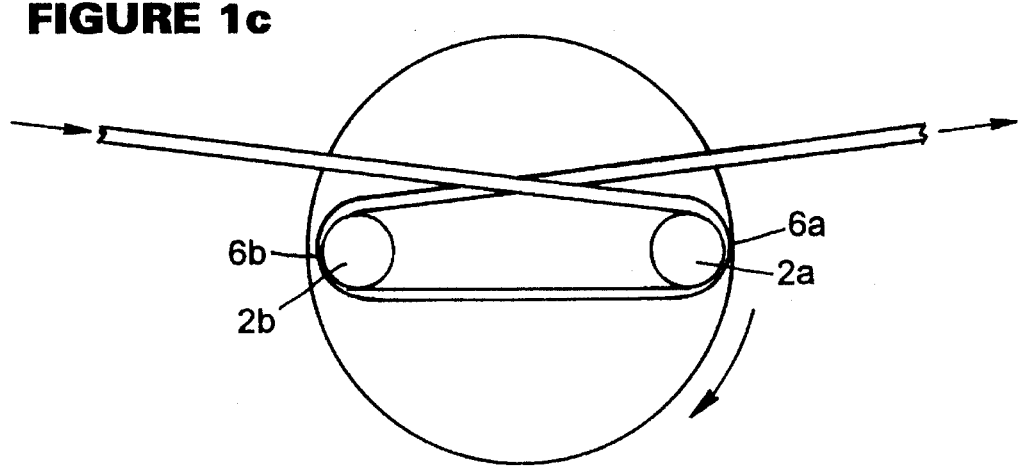

In use the support disc 1 is rotated in the direction of the arrow shown in FIGS. 1a to c, which causes the rollers 2a, 2b to progressively move along the flexible tube 3. Water trapped between the occlusions 6a, 6b is progressively thereby moved along the flexible tube 3 from the inlet side 4 to the outlet side 5.

Figure 2:
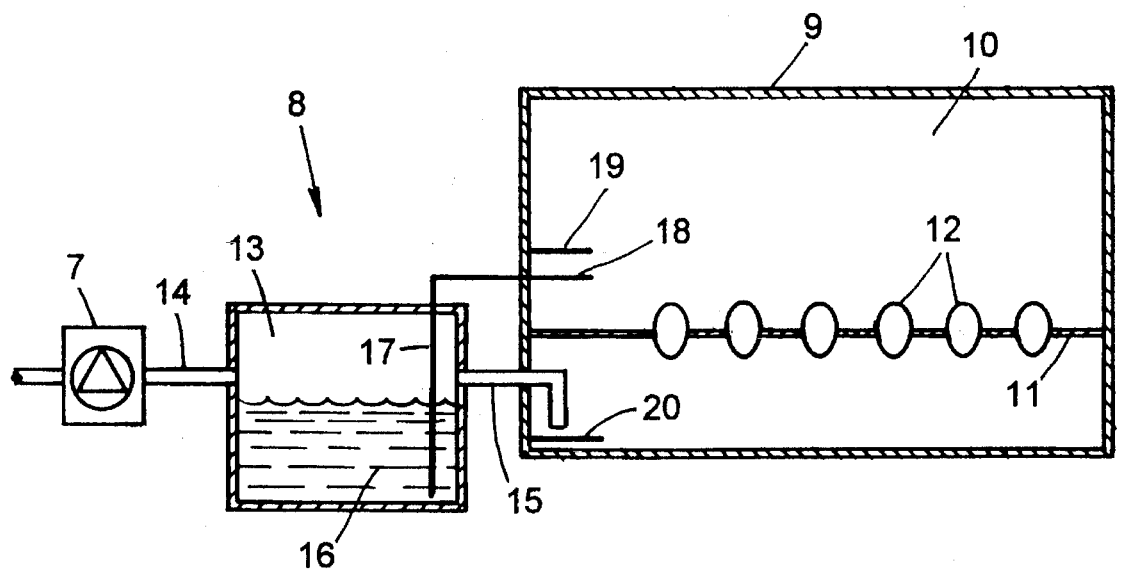
FIG. 2 is a schematic cross-sectional view of an incubator having a humidity control system according to the present invention.

The peristaltic pump 7 shown in FIG. 1 forms part of the humidity control system (generally shown as 8) of the incubator 9 of FIG. 2. The incubator 9 comprises an incubator chamber 10 having an egg support tray 11 on which eggs 12 are supported. The humidity control system 8 includes the peristaltic pump 7 and an intermediate reservoir 13. The reservoir 13 is a closed container having an inlet 14 connected to the peristaltic pump 7 and an outlet 15 opening into the incubator chamber 10 both of which are situated near the top of the container. The reservoir 13 contains stored water 16 into which the wick 17 of a wet bulb sensor 18 is immersed. The wet bulb wick 17 passes through the reservoir wall near to the top and passes down inside the reservoir 13 to its bottom. The wet bulb sensor 18 itself extends into the incubation chamber 10 close to a dry bulb sensor 19. In the incubation chamber 10 below the outlet 15 of the reservoir 13 is an absorbent material 20.

In use water is pumped from a main reservoir (not shown) by the peristaltic pump 7 through the inlet 14 of the reservoir 13 until that reservoir is full and water then leaves the reservoir 13 via the outlet 15 by which it is delivered to the absorbent material 20 and thereby is able to humidify the incubation chamber 10. When the humidity of the incubation chamber 10 is at the desired level, as sensed by the wet and dry bulb sensors 18 and 19 a signal is sent to stop the peristaltic pump 7 from pumping further water. As the wick 17 of the wet bulb sensor 18 remains immersed in the water 16 stored in the reservoir 13 even when the pump 7 has ceased to pump humidifying water, the wet bulb sensor 18 is able to continue measuring the humidity in the incubation chamber 10 until such time as the water 16 stored in the reservoir 13 is exhausted. The difference in level between the lowest part of the wick 17 and the position of the outlet 15 to the incubator chamber 10 represents the volume of water 16 uniquely available to the wet bulb wick 17.

What is claimed is:

1. A humidity control system for measuring and controlling the humidity of a controlled environment comprising a pump capable of supplying water when desired to the controlled environment and sensors capable of measuring the humidity in the controlled environment, the pump being a peristaltic pump which comprises a flexible tube for the passage of a fluid having an inlet and an outlet and a roller assembly comprising a number of rollers and a rotatable support, the rollers being mounted on and extending substantially perpendicularly outwardly from the rotatable support and the tube being stretched over the roller assembly so that it extends substantially perpendicularly to the rollers and through substantially 360° around the roller assembly and where the tube contacts a roller it is compressed against that roller, the arrangement being such that in use where the tube is compressed against a roller it is occluded and rotation of the roller assembly causes each roller to contact and thereby occlude successive parts of the tube forcing fluid contained in the tube and trapped between the occlusions to be moved along the tube from the inlet towards the outlet.

2. A humidity control system according to claim 1, wherein in the peristaltic pump two rollers alone are mounted on the rotatable support.

3. A humidity control system according to claim 1, wherein in the peristaltic pump the tube bends through an angle of 160 ° to 200 ° as it extends past each roller.

4. A humidity control system according to claim 1, wherein in the peristaltic pump the diameter of the roller substantially corresponds in size to or is less than the outer diameter of the tube.

5. A humidity control system according to claim 1, wherein in the peristaltic pump there is more than one tube extending around the roller assembly.

6. A humidity control system according to claim 1, wherein in the peristaltic pump the inlet of the tube is anchored on one side of the roller assembly and the outlet on an opposing side and the inlet and outlet sides of the tube are anchored at positions approximately level with a point halfway between the central axis of rotation of the roller assembly and a point on the circumference of the circle of rotation of the rollers which in use is vertically above the central rotational axis.

7. A humidity control system according to claim 1, wherein the peristaltic pump further has a motor driven shaft and the roller assembly is mounted on that motor driven shaft.

8. A humidity control system according to claim 1, wherein the sensors are electronic humidity sensors.

9. A humidity control system according to claim 1, wherein the sensors are wet bulb and dry bulb temperature sensors.

10. A humidity control system for measuring and controlling the humidity of a controlled environment comprising a pump capable of supplying water when desired to the controlled environment, a dry bulb and a wet bulb temperature sensor capable of measuring the humidity in the controlled environment, the wet bulb temperature sensor being provided with a wick via which it can be kept wet, and a storage reservoir which is provided with an inlet connectable to the pump and is capable of storing water supplied to it by the pump and into which the wet bulb wick can extend so as to be moistened by any water stored therein, the pump being a peristaltic pump which comprises a flexible tube for the passage of a fluid having an inlet and an outlet and a roller assembly comprising a number of rollers and a rotatable support, the rollers being mounted on and extending substantially perpendicularly outwardly from the rotatable support and the tube being stretched over the roller assembly so that it extends substantially perpendicularly to the rollers and through substantially 360° around the roller assembly and where the tube contacts a roller it is compressed against that roller, the arrangement being such that in use where the tube is compressed against a roller it is occluded and rotation of the roller assembly causes each roller to contact and thereby occlude successive parts of the tube forcing fluid contained in the tube and trapped between the occlusions to be moved along the tube from the inlet towards the outlet.

11. A humidity control system according to claim 10, wherein the storage reservoir is supplied with water from the flow of humidifying water being supplied to the controlled environment.

12. A humidity control system according to claim 10, wherein the storage reservoir is provided with an outlet in fluid communication with the controlled environment, is supplied with water from the flow of humidifying water being supplied to the controlled environment and is situated so that it must be filled before humidifying water can enter the controlled environment.

13. An incubator comprising an incubation chamber and a humidity control system for measuring and controlling the humidity within the incubation chamber which comprises a pump capable of supplying water to the incubation chamber and sensors capable of measuring the humidity in the incubation chamber, the pump being a peristaltic pump which comprises a flexible tube for the passage of a fluid having an inlet and an outlet and a roller assembly comprising a number of rollers and a rotatable support, the rollers being mounted on and extending substantially perpendicularly outwardly from the rotatable support and the tube being stretched over the roller assembly so that it extends substantially perpendicularly to the rollers and through substantially 360° around the roller assembly and where the tube contacts a roller it is compressed against that roller, the arrangement being such that in use where the tube is compressed against a roller it is occluded and rotation of the roller assembly causes each roller to contact and thereby occlude successive parts of the tube forcing fluid contained in the tube and trapped between the occlusions to be moved along the tube from the inlet towards the outlet.

14. An incubator comprising an incubation chamber and a humidity control system for measuring and controlling the humidity in the incubation chamber comprising a pump capable of supplying water to the incubation chamber, a dry bulb and a wet bulb temperature sensor capable of measuring the humidity in the incubation chamber, the web bulb temperature sensor being provided with a wick via which it can be kept wet and a storage reservoir which is provided with an inlet connectable to the pump and is capable of storing water supplied to it by the pump and into which the wet bulb wick can extend so as to be moistened by any water stored therein, the pump being a peristaltic pump which comprises a flexible tube for the passage of a fluid having an inlet and an outlet and a roller assembly comprising a number of rollers and a rotatable support, the rollers being mounted on and extending substantially perpendicularly outwardly from the rotatable support and the tube being stretched over the roller assembly so that it extends substantially perpendicularly to the rollers and through substantially 360° around the roller assembly and where the tube contacts a roller it is compressed against that roller, the arrangement being such that in use where the tube is compressed against a roller it is occluded and rotation of the roller assembly causes each roller to contact and thereby occlude successive parts of the tube forcing fluid contained in the tube and trapped between the occlusions to be moved along the tube from the inlet towards the outlet.

15. An incubator according to claim 14, which is for the incubation of eggs and is provided with an egg support situated in the incubation chamber.

\* \* \* \* \*